United States Patent [19]

Hunt, Jr. et al.

[11] Patent Number: 5,003,496

[45] Date of Patent: Mar. 26, 1991

[54] PAGE MEMORY CONTROL IN A RASTER IMAGE PROCESSOR

[75] Inventors: William E. Hunt, Jr.; David J. Statt, both of Rochester; Mark R. Warda, Fairport, all of N.Y.

[73] Assignee: Eastman Kodak Company, Rochester, N.Y.

[21] Appl. No.: 236,811

[22] Filed: Aug. 26, 1988

[51] Int. Cl.$^5$ .............................................. G06F 15/20
[52] U.S. Cl. .................................... 364/521; 346/160; 364/518; 340/703
[58] Field of Search ............................ 364/518–522; 340/701, 703, 721, 723; 346/160, 33 R, 154; 358/93, 324, 334, 17, 28

[56] References Cited

U.S. PATENT DOCUMENTS

| | | | |
|---|---|---|---|
| 4,367,533 | 1/1983 | Wiener | 364/519 |
| 4,412,296 | 10/1983 | Taylor | 364/521 |
| 4,516,139 | 5/1985 | Takiguchi | 346/140 R |
| 4,521,770 | 6/1985 | Rhyne | 340/703 |
| 4,584,573 | 4/1986 | Ito | 340/734 |
| 4,589,035 | 5/1986 | Yamanishi et al. | 358/296 |
| 4,616,336 | 10/1986 | Robertson et al. | 364/900 |
| 4,628,305 | 12/1986 | Ikeda | 340/703 |
| 4,649,513 | 3/1987 | Martin et al. | 364/900 |
| 4,682,190 | 7/1987 | Ikeda | 346/154 |
| 4,730,185 | 3/1988 | Springer et al. | 340/701 |
| 4,769,636 | 9/1988 | Iwami et al. | 340/724 |
| 4,796,203 | 1/1989 | Roberts | 364/521 |
| 4,806,919 | 2/1989 | Nakayama et al. | 340/721 |
| 4,821,212 | 4/1989 | Heartz | 364/521 |
| 4,825,390 | 4/1989 | Van Aken et al. | 364/521 X |
| 4,829,455 | 5/1989 | Long et al. | 364/521 |

FOREIGN PATENT DOCUMENTS

0217477 4/1987 European Pat. Off. .

Primary Examiner—Gary V. Harkcom
Assistant Examiner—H. R. Herndon
Attorney, Agent, or Firm—Thomas H. Close

[57] ABSTRACT

A raster image processor for an all points addressable marking engine includes a page memory having a data input and a write enable input. Halftone tints are applied to bit maps of objects stored in the page memory by applying a tint bit pattern to the data input of the page memory while a bit pattern representing the object is being applied to the write enable input of the page memory. Prior to applying the object bit maps to the write enable input of the page memory, the object bit maps may be combined with a texture bit pattern or clipped by a window bit pattern.

31 Claims, 10 Drawing Sheets

PAGE MEMORY CONTROL IN A RASTER IMAGE PROCESSOR

FIELD OF THE INVENTION

The present invention relates to a raster image processor for generating the printing signals for a marking engine, and more particularly to a method and apparatus for controlling a page memory in a raster image processor.

BACKGROUND OF THE INVENTION

An all points addressable marking engine such as a laser, ink jet, or dot matrix printer, is capable of placing a mark at any one of a large number of pixel locations on a page. Typically, a controller in the marking engine receives an electronically encoded stream of text and graphics instructions from an external source and generates a signal for controlling the marking engine. Since such marking engines often function to mark one line of pixels at a time, in raster fashion, the controller is commonly referred to as a raster image processor or RIP.

A RIP includes, for example, a microprocessor for control and data manipulation, a font memory for storing bit maps of alphanumeric characters and graphic objects, and a page memory for storing the bit map representation of a page of information. The page memory contains a memory location for each location on the page where a mark can be made by the marking engine. The bit map in the page memory may consist for example of "1"s to indicate that a mark is to be made at the corresponding location on the page, or "0"s to indicate that the location is to be left blank. The page memory can store a full or partial page.

In operation, the processor receives a code such as ASCII code indicating a character and the location it is to be printed, and retrieves a bit map representation of the indicated character from the font memory. The processor then stores the bit map in the desired location in the page memory. When the page memory has been filled in this fashion, the contents of the memory are addressed, one line at a time, to drive the marking engine.

Often, it is desirable to have the RIP alter the pattern of the bit map stored in the page memory in one or more ways prior to driving the marking engine. For example, it may be desired to clip or "chop off" a portion of a character or graphic object that lies outside of a clipping boundary or "window" that is specified in the commands sent to the RIP. It may further be desired to pattern or texture the character or graphic object with a pattern such as cross-hatching. It may also be desirable to provide halftone shading of the character or graphic object, or to provide shading of an area within a window.

Generally, each of the processes described above require that the pattern of bits in the page memory be altered. Previously, such alteration has involved additional processing steps that slow down the rate at which objects can be written into the page memory. For example, see published European patent application No. 0 210 447, published 08.04.87, by Willems et al. Willems et al disclose a raster image memory which can be filled with the bit map representations of characters and graphic objects to be printed. The contents of the memory can then be altered to invert the polarity (e.g. change black to white or vice versa) of characters, to fill a predetermined area with a texture pattern such as blocks or hatching, and to fill an area surrounded by lines with a repeating pattern. The contents of the memory are changed by reading out the present contents, performing a logical operation on the contents in a logical processing unit, and replacing the original contents of the memory with the modified contents. This approach suffers from the drawback noted above in that it takes time to read out the contents of the memory, perform the logical operations, and replace the modified contents in the memory. In another approach disclosed in U.S. Pat. No. 4,584,573, issued Apr. 22, 1986 to Ito, character pattern data developed from a character pattern data generation circuit and background pattern data developed from a background pattern data generation circuit are combined at an OR gate prior to printing. This approach is not subject to the delays inherent in the previously noted approach, but is rather limited in the types of modifications that are possible.

It is therefore the object of the present invention to provide a raster image processor and a method of controlling a bit map memory in a raster image processor for applying halftone tints, textures and windowing patterns to bit map representations of characters and graphic objects, that is free of the shortcomings noted above.

SUMMARY OF THE INVENTION

The object of the invention is achieved by providing a raster image processor having a page memory for the storage of a bit pattern representation of a page to be printed by an all points addressable marking engine. The page memory includes a data input and a write enable input. A tint generator in the raster image processor generates a bit pattern representing a halftone tint, and applies the tint bit pattern to the data input of the page memory. A page bit pattern representing a page of objects such as character fonts and graphic objects is supplied by a source and is applied to the write enable input of the page memory. Addressing the memory in this way has several advantages over the prior art methods. The tint pattern is automatically ANDed with the character and graphic data without the need for additional logic gates. Also, the contents of the memory can be simply written over without the need for reading out or disturbing the previous contents.

In a preferred mode of practicing the invention, a texture generator generates a bit pattern representing a texture pattern. The page bit pattern and the texture bit pattern are combined to produce a combined bit pattern and the combined bit pattern is applied to the memory write enable input of the page memory.

In a further extension of the invention, a window generator produces a bit pattern representing a clipping window, and the window bit pattern is combined with the texture bit pattern and the page bit pattern before the combined pattern is applied to the memory enable input of the page memory.

According to another aspect of the present invention, the page bit map pattern is stored in the page memory as a string of sequentially numbered n-bit words. A page height is defined in n-bit words, and a page memory is generated from x,y page coordinates according to the formula:

$$PA = (PH*y) + x/n,$$

where PA is the sequential address of a word in page memory, PH is the page height expressed in n-bit words, and x/n is the x page coordinate expressed in n-bit words.

According to a further aspect of the invention, the bit maps for alphanumeric characters or graphic objects are generated as blocks of bits composed of bit wide columns of n-bit data words. A data conditioner enables an alphanumeric character or graphic object to be placed at any pixel location in the x direction by responding to a shift command to shift the bits in a data word by an appropriate amount to place the bit map of the object at the desired x coordinate position on a page.

According to a further aspect of the present invention, the raster image processor is employed to drive a color marking engine, wherein a plurality of primary color bit patterns are sequentially sent to the marking engine, and the tint generator includes means for shifting the tint pattern for one primary color with respect to the tint pattern for another primary color to minimize dot overlap among colors. By selecting different tint levels for the different primary colors, a spectrum of secondary colors can be produced. In one embodiment, the primary color component bit maps are generated one at a time in the page memory, and sent to the marking engine.

In another embodiment, a separate page memory and tint generator is provided for each color component and all the color components are generated in parallel by setting the respective tint levels for the primary color components of each object, and sending the object data to all the color component page memories simultaneously.

MODES OF CARRYING OUT THE INVENTION

Figure 1:
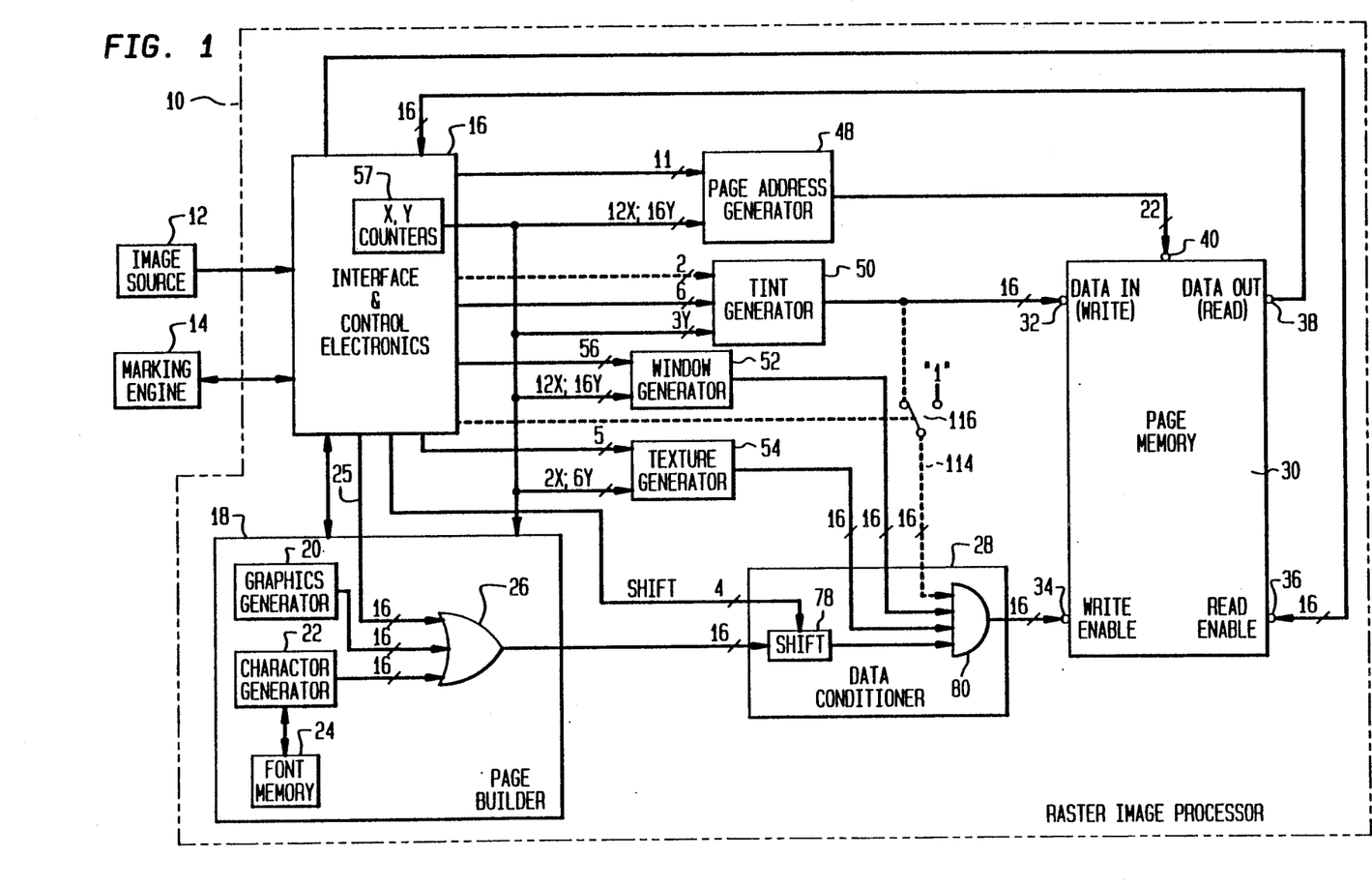
FIG. 1 is a block diagram of a raster image processor according to the present invention.

Referring to FIG. 1, a raster image processor (RIP) 10 receives a file of page generation instructions, called a display list, from an image source 12, such as a mainframe computer, personal computer, graphics work station, image scanner, or optical character recognition device, and generates bit map data for driving an all points addressable marking engine 14. The marking engine 14 may comprise for example a thermal, inkjet, dot matrix impact, or electrophotographic printer.

The RIP includes interface and control electronics (ICE) 16 that controls the overall operation of the RIP and provides an interface with the image source 12 and the marking engine 14. The ICE 16 may comprise a programmed microprocessor as is well known in the art.

A page builder 18 receives page building instructions from the ICE 16 and generates bit map print data representing graphic objects and alphanumeric characters. The bit map print data is supplied from the page builder 18 as 16-bit words. Page builder 18 includes a graphics generator 20 for generating bit maps of graphic objects from primitive vector generating and trapezoid filling commands, and a character generator 22 for generating character bit maps from character defining code such as ASCII code. The character generator 22 retrieves the character bit maps as 16-bit words from a font memory 24. The page builder 18 may also receive original bit map data directly from the ICE 16, as illustrated by line 25. As illustrated schematically by OR gate 26, either graphic, character or original bit map data are supplied as 16-bit words by the page builder 18. The 16-bit words from page builder 18 are combined with clipping window and texture bit maps, as described below, in data conditioner 28.

The RIP 10 also includes a page memory 30 where the bit map representation for a page is accumulated and stored prior to sending the printing instructions to the marking engine. The page memory 30 has a data input 32 for receiving a 16-bit word, a write enable input 34 for selectively enabling each one of the 16-bits in the input word, a read enable input 36, a data output 38, and a memory address input 40.

Figure 2:
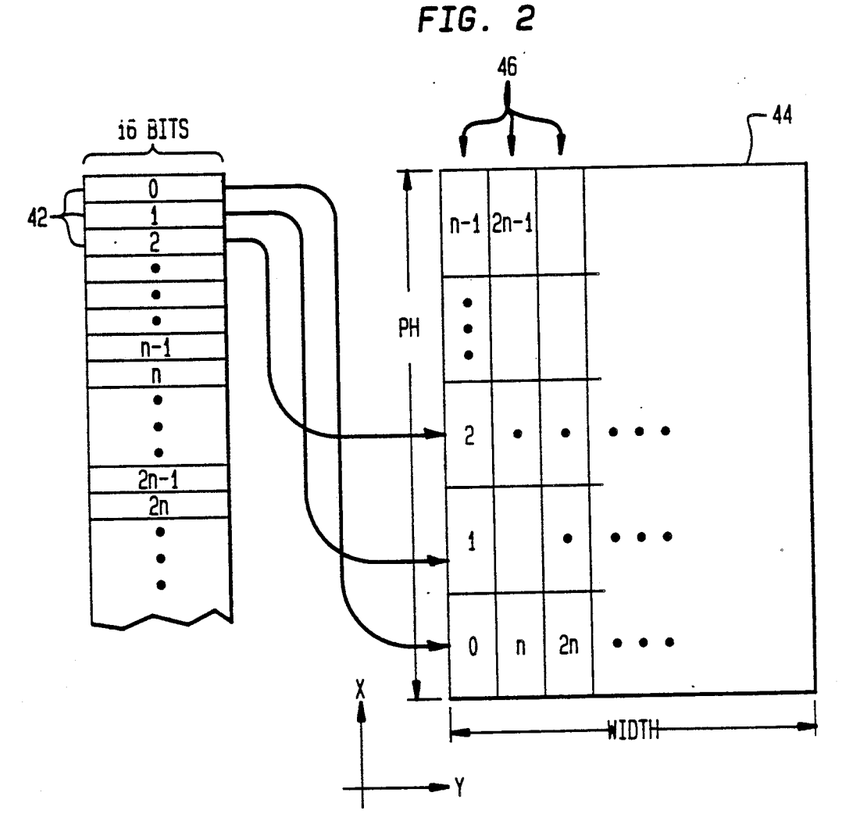
FIG. 2 is a diagram illustrating the organization of the page memory shown in FIG. 1.

The bit map data is organized in the page memory 30 as shown in FIG. 2. The 16-bit words 42 are stored consecutively in memory as shown by the illustration on the left in FIG. 2. When a page of bit map data is reproduced from the page memory, the page 44 is composed of vertical strips 46, one bit wide, with n 16-bit words in each strip, as shown in the illustration to the right in FIG. 2. The page height PH (in the x direction) is the number n of 16-bit words in a vertical strip and the page width (in the y direction) is defined in bits. Thus, for a 300 dot per inch marking engine, an 8½ inch by 11 inch page would be 2550 bits wide by 207 words long.

The x and y coordinates, expressed in bits (pixels) are each defined by 16-bit words. The 12 most significant bits of the x coordinate value expressed in bits represent the x coordinate value expressed in 16-bit words. The four least significant bits of the x coordinate value define a shift value that is employed as explained below to selectively place a character or graphic object any where on the page in the x direction.

Returning to FIG. 1, a page address generator 48, generates the address for each 16-bit word that is to be stored in the page memory 30. The address is supplied as a 22 bit address to the address input 40 of the page memory 30. A tint generator 50, generates a bit pattern representing a halftone tint, and applies the bit pattern as 16-bit words to the data input 32 of the page memory 30. A clipping window generator 52 generates a bit pattern representing a clipping window mask and supplies the bit pattern, as 16-bit words, to data conditioner 28. A texture generator 54 generates a bit pattern representing a texture such as a checkerboard or diagonal stripes, and applies the texture bit pattern as 16-bit words to the data conditioner 28. The 16-bit output of data conditioner 28 is supplied to the write enable input 34 of the page memory 30. Each bit of the output from data conditioner 28 applied to the write enable input 34 enables a corresponding bit at the data input 32 of the page memory 30 to be written.

Figure 3:
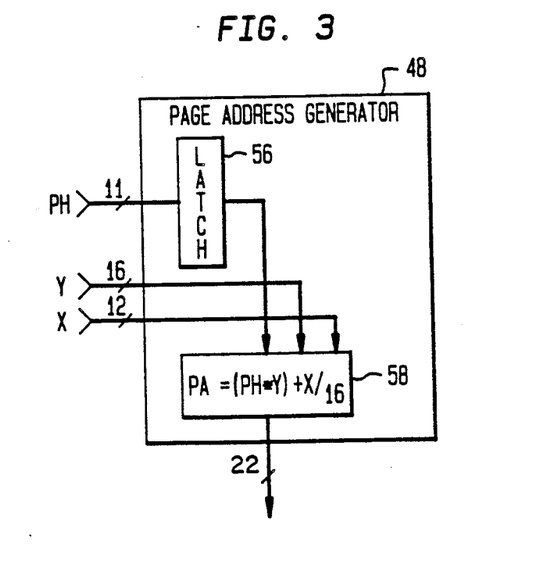
FIG. 3 is a schematic diagram of the page address generator shown in FIG. 1.

Referring now to FIG. 3, the page address generator 48 will be described in more detail. The page address generator receives an 11 bit word defining the page height PH (expressed in 16-bit words) from the ICE 16. This value is held in a latch 56, and supplied to a calculator 58 that also receives x and y coordinate values from an x, y counter 57 in ICE 16, and calculates the word address PA in page memory 30 as:

$$PA = (PH*y) + x/16. \quad (1)$$

where

PA is the word address in memory 30,
PH is the page height expressed in 16-bit words;
y is the pixel coordinate in the y direction on the page;
x/16 is the x coordinate in the x direction on the page expressed in words (this is the 12 most significant bits of the x coordinate expressed in bits).

Figure 4:
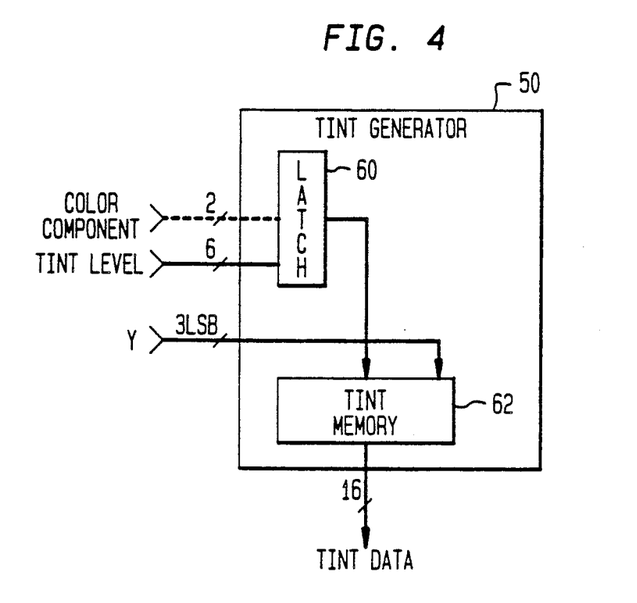
FIG. 4 is schematic diagram of the tint generator shown in FIG. 1.
Figure 5:
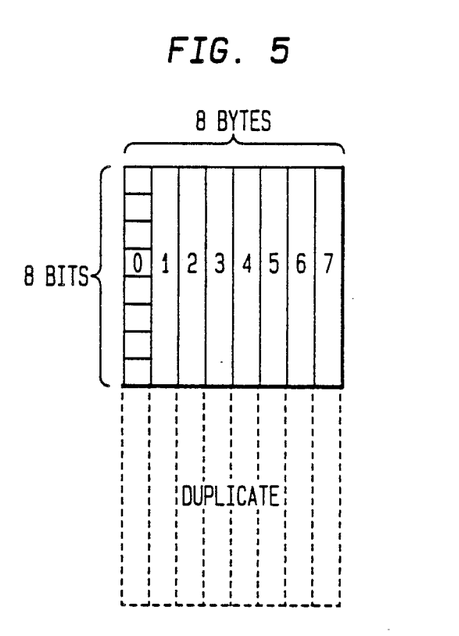
FIG. 5 is a diagram illustrating the format of the tint patterns stored in the tint memory in FIG. 4.

Referring now to FIGS. 4 and 5, the tint generator 50 will be described in more detail. The tint generator 50 receives a 6 bit tint level command from the ICE 16 specifying one of 64 possible tint patterns to be produced. The tint level command is held in a latch 60 and employed to address a tint memory 62 (for example a programmable read only memory). The 64 tint patterns are stored in tint memory 62 as blocks of 8 bytes (1 byte = 8 bits), as shown in FIG. 5. The three least significant bits of the y coordinate value from the ICE 16 are employed to address the particular byte in the tint pattern memory. Upon readout, each byte is duplicated as shown in FIG. 5, and the duplicated bit pattern is supplied as 16-bit words to the data input 32 of page memory 30.

Figure 6:
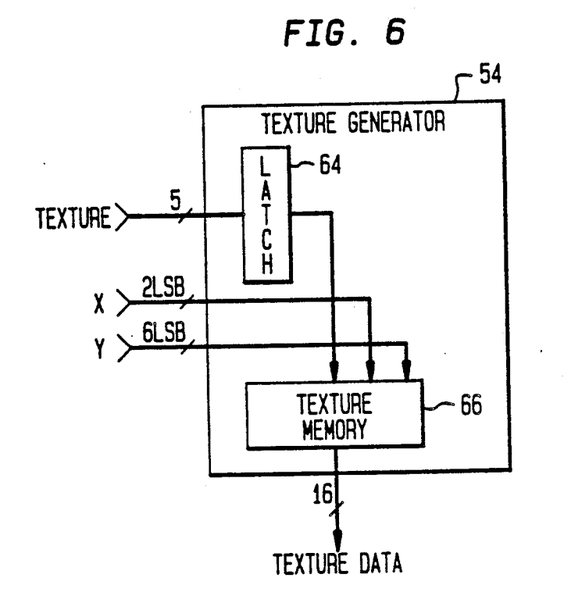
FIG. 6 is a schematic diagram of the texture generator shown in FIG. 1.
Figure 7:
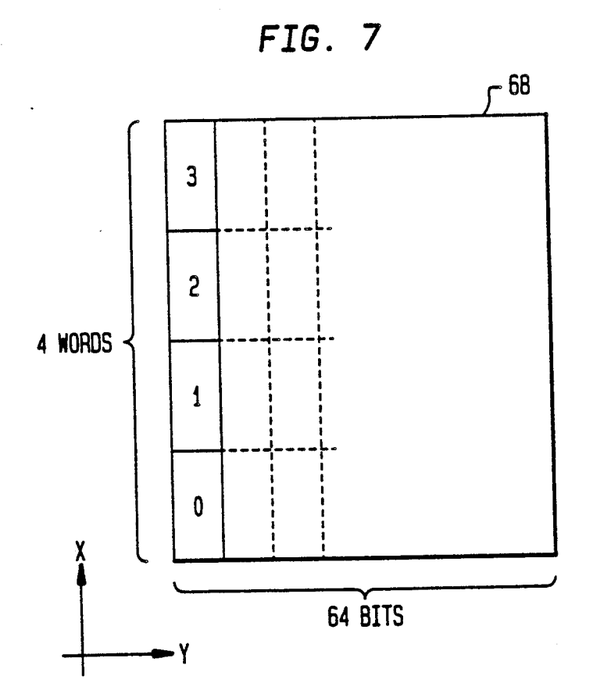
FIG. 7 is a diagram illustrating the format of the texture patterns stored in the texture memory in FIG. 6.

Referring now to FIGS. 6 and 7, the texture generator 54 will be described in further detail. The texture generator 54 receives a 5 bit texture command from ICE 16 that specifies one of 32 possible texture patterns to be produced. The texture command is held in a latch 64 and employed to address a texture memory 66. As shown in FIG. 7, the texture patterns are stored in texture memory 66 as 64 by 64 bit blocks 68. The blocks are divided into 16-bit words in the x direction, such that each column of bits in the x direction is four words high. The words in a block are addressed by the two least significant bits of the x coordinate value expressed in words, and the five least significant bits of the y coordinate value. The 16-bit words are supplied one word at a time to the data conditioner 28.

Figure 8:
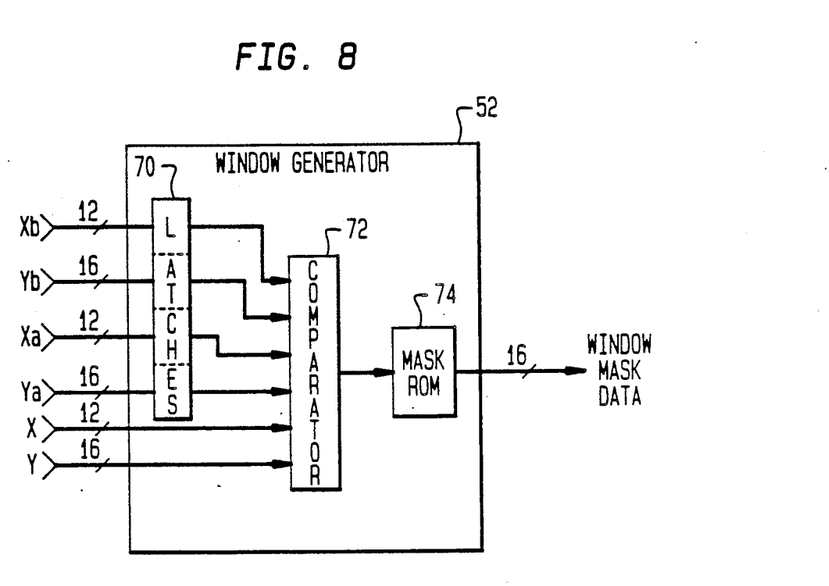
FIG. 8 is a schematic diagram of the window generator shown in FIG. 1.
Figure 9:
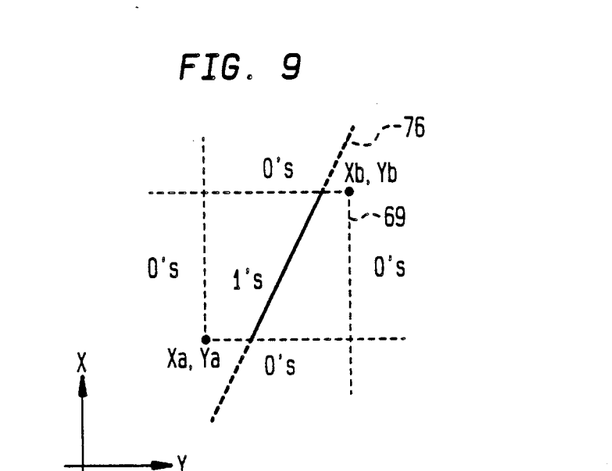
FIG. 9 is a diagram useful in describing the operation of the window generator in FIG. 8.

Referring now to FIGS. 8 and 9, the window generator 52 will be described in further detail. As shown in FIG. 9, a rectangular clipping window 69 is defined by a lower limit $x_a, y_a$ and an upper limit $x_b, y_b$ on a page. The lower limit defines the bottom and left sides of the rectangular clipping window 69, and the upper limit defines the top and right side of the rectangular clipping window 69. Referring to FIG. 8, the window generator 52 receives the upper and lower limits from the ICE 16 and latches these values in a set of latches 70. The latched values are supplied to a comparator 72 where they are compared with the current x,y coordinate values received from the x,y counters 57 in the ICE 16. The results of the comparison are supplied to a read only memory (ROM) 74 that is programmed to produce a 16-bit word representing the window mask for the current word address. The 16-bit word representing the window mask is supplied to data conditioner 28. As shown in FIG. 9, portions of a line 76 within the window 69 will be printed, and portions of the line falling outside the window will be clipped (i.e. not printed).

Figure 10:
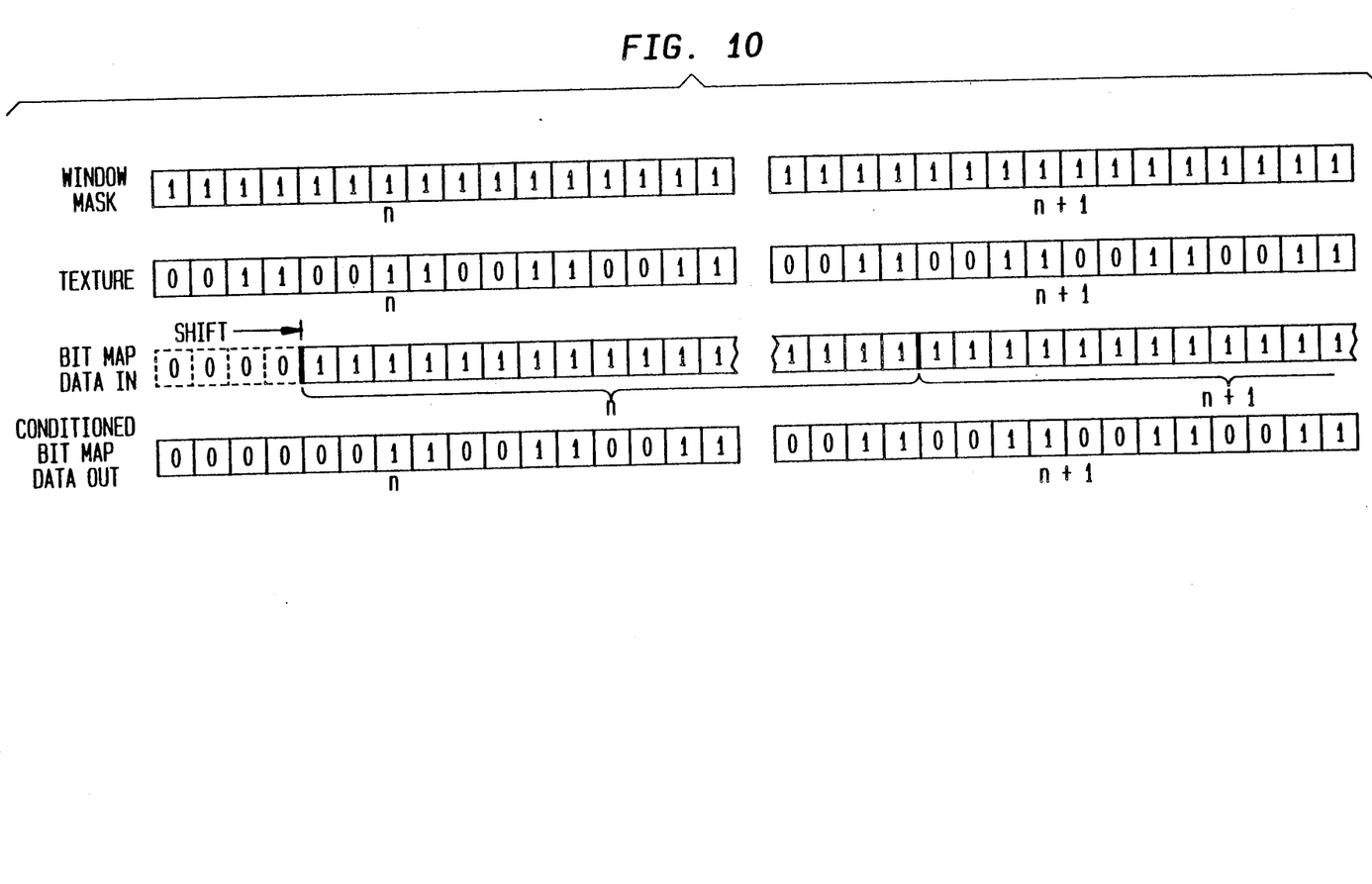
FIG. 10 is a diagram useful in describing the operation of the data conditioner shown in FIG. 1.

The operation of the data conditioner 28 will now be described in further detail with reference to FIGS. 1 and 10. The data conditioner 28 receives bit map data from page builder 18, window mask data from window generator 52, and texture data from texture generator 54 and produces conditioned bit map data that is applied to the write enable input 34 of page memory 30. As pointed out above, the page memory is organized as 16-bit words in the x direction. To enable a character or graphic object to be placed anywhere on the page in the x direction, the data conditioner 28 is provided with a bit shifter 78. The bit shifter is a register that receives the 16-bit data word and loads it at a position indicated by a four bit shift command from the ICE 16. The four bit shift command is the four least significant bits of the 16-bit x coordinate value (expressed in bits). The first m bits of the bit shifter 78 are either loaded with 0's if it is the first word in a column, or with the leftover bits from the previous data word. The shifted bit map data is combined with the texture data from texture generator 54, and the window mask from window generator 52, as represented schematically in FIG. 1 by AND gate 80. FIG. 10 shows how the bit map data word is shifted with respect to the window mask and the texture data words to produce conditioned output bit map data words. In the example shown in FIG. 10, the shift value is four bits (or pixels). The $n^{th}$ data word is the first word in a column, so the first four bits in the bit shifter are set to zero. For the $n+1^{st}$ data word, the first four bits in the bit shifter are the last four bits left over from the $n^{th}$ word, and so on.

The operation of the RIP will now be described with reference to Table I below which contains an exemplary display list.

TABLE I

1. Set page height to ($PH_1$)
2. Set clipping window to $W_1$ ($x_a, y_a; x_b, y_b$)
3. Set tint pattern to ($T_1$)
4. Set texture to ($TX_1$)
5. Place Object 1 at ($x_1, y_1$)
6. Set tint pattern to ($T_2$)
7. Set texture to ($TX_1$)
8. Place Object 2 at ($x_2, y_2$)

Figure 11:
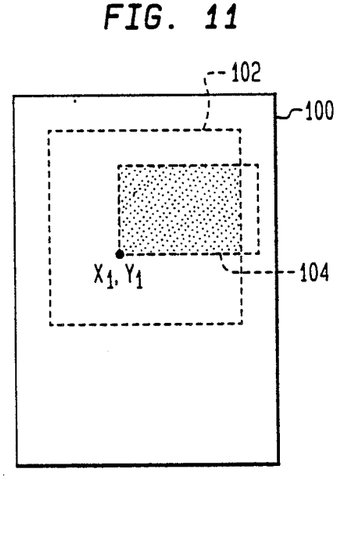
FIGS. 11, 12 and 13 illustrate effects that can be achieved with the raster image processor of the present invention.

The image source 12 supplies the display list as exemplified in Table I to the ICE 16. The ICE interprets the first command to set the page height to a value $PH_1$ expressed in 16-bit words. The page height command is sent to the page address generator 48, where it is latched in latch 56. The page address generator will subsequently produce a page address in response to each pair of x,y coordinate values supplied by the x,y counters 57 in the ICE 16. The ICE 16 interprets the second command to set a clipping window, and sends the lower and upper clipping boundaries ($x_a,y_a;x_b,y_b$) to the clipping window generator 52. The clipping window generator 52 latches the clipping boundary values and produces 16-bit words with 1's inside the window, and 0's outside the window in response to the x,y coordinate values sent by the ICE 16. FIG. 11 shows a page 100, with the clipping window 102 outlined by dashed lines.

The ICE 16 interprets the third command to select a specific tint pattern specified by $T_1$, and sends a 6 bit tint level signal to the tint generator 50 to select the desired tint pattern in the tint memory 62. The tint generator 50 latches this level and produces 16-bit tint pattern words in response to the three least significant bits of the y coordinate values sent by ICE 16. The ICE interprets the fourth command to select a desired texture pattern in the texture memory 66 in the texture generator 54. The texture generator latches the texture value and produces 16-bit texture words in response to x and y coordinate values received from ICE 16. The fifth command is interpreted by the ICE to place a specified object at the specified location ($x_1, y_1$). The ICE 16 sends the 4 bit shift value (the four least significant bits of the x coordinate value) to the data conditioner 28 and instructs the page builder 18 to generate the bit pattern for the specified object. For example, the object may be a filled rectangle 104 as shown in FIG. 11, which would be generated by the graphics generator 20. The graphics generator 20 produces 16-bit words representing the graphic object in response to the x,y coordinate values supplied by the ICE 16.

When the setup for the first object is complete, ICE 16 causes the x,y counters 57 to generate the x,y coordinate values for all the 16-bit words in the object. As the x,y coordinate values for each consecutive word of the graphic object are generated by x,y counters 57, the x,y coordinate values are also supplied to the page address generator 48, the tint generator 50, the clipping window generator 52, the texture generator 54 and the page builder 18. Upon receipt of the x,y coordinate values, the page address generator 48 generates and issues a page address to the page memory. Upon receipt of the x,y coordinate values, the tint generator, clipping window generator, texture generator, and page builder each issue a 16-bit word for the indicated coordinate location. The 16-bit word from the page builder is shifted and combined with the 16-bit words from the texture generator and the clipping window within the data conditioner 28 and applied to the write enable input 34 of the page memory 30. The output of the tint generator 50 is applied to the data input of the page memory. If the memory is enabled, i.e. if the output of the data conditioner 28 contains a 1 at a particular location in the 16-bit word, the output of the tint generator 50 at the corresponding bit position will be written into memory. If the memory is not enabled, i.e. if the output of data conditioner 28 contains a 0, no change will be made to the current contents of the page memory.

Referring to FIG. 11, the first object written into memory is a rectangle 104 placed at location $x_1, y_1$ on the page 100. The portion of the rectangle falling outside the window 102 was not written into page memory 30 since the output of the clipping window generator 52 was 0 in this region. Inside the clipping window 102, the rectangle is shaded with the selected tint pattern. The texture selected for Object 1 was a solid texture with no pattern. This solid texture is also a default option if no texture command is given in the command list.

Next, the ICE 16 interprets the sixth command to set a new tint pattern $T_2$, (e.g. a solid or maximum density pattern where all the bits in the pattern are 1's) and sends the appropriate tint select signal to tint generator 50. The seventh command is interpreted to set a new texture pattern $TX_2$ (e.g. a diagonal stripe pattern), and the texture select signal is sent to the the texture generator 54 to select the bit pattern for the selected texture.

Figure 12:
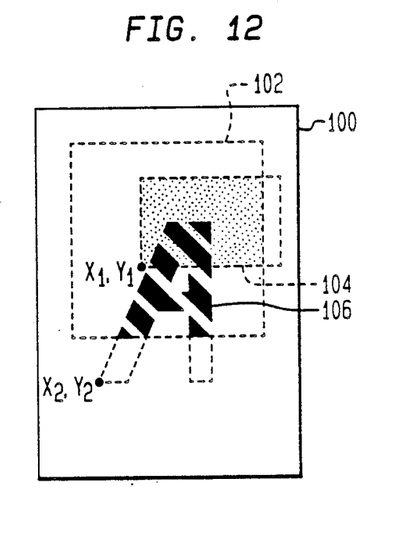

The ICE 16 interprets the eighth command to place object 2 (e.g. a block letter A) at location $x_2,y_2$. Once again, the ICE 16 sends the appropriate shift command to the data conditioner, and has the x,y counters 57 send the x and y coordinate values of all the 16-bit words making up the character. Typically, the alphanumeric character is identified by an ASCII code and accompanying code that identifies the type font and character size. The character generator 22 in the page builder 18 responds to the code to retrieve the character bit map from the font memory 24. As the x,y counter 57 steps through the coordinate values of the 16-bit words in the character, each data word is appropriately shifted and is combined with the corresponding texture and window bits by data conditioner 28 to produce a conditioned data word. When all corresponding bits at a particular bit position in a 16-bit word are 1's, the output of the data conditioner 28 is a 1, and the memory is enabled to receive an input on data input 32. Since the tint generator in this example is outputting all 1's (i.e. a maximum density tint), the textured character 106 is written into the page memory 30, as shown in FIG. 12. The portions of the character that lie outside the clipping window 102 are not written into the page memory 30, and are shown by dashed lines in FIG. 12.

Figure 13:
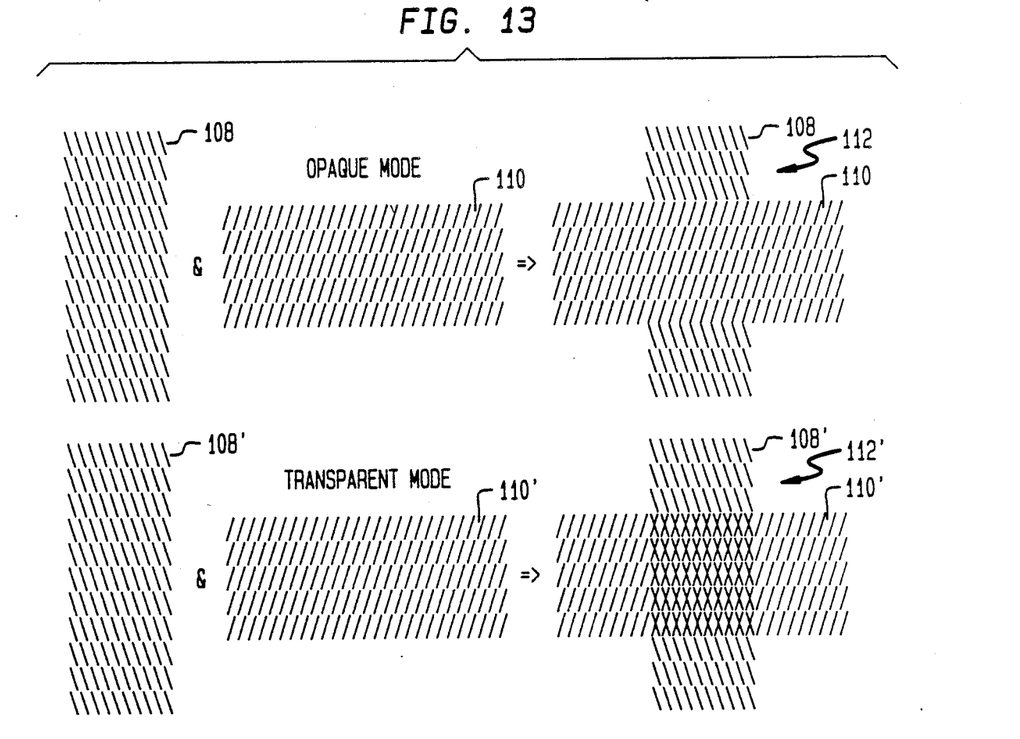

In the mode of operation described above, when a bit pattern is written into the page memory, the previous contents of the memory are replaced by the new pattern of 1's and 0's. In an analogy to an artist's paints, this mode of operation resembles oil painting, where the medium is opaque. Alternatively, the raster image processor of the present invention may be operated in a mode analogous to water colors, where the medium is transparent. In the transparent mode, when new bit patterns are written into the memory, only the 0's in the previous bit pattern are replaced by 1's in the new bit pattern. FIG. 13 illustrates the difference between the "opaque" and "transparent" modes of operation. In the example illustrating the opaque mode of operation a tall rectangular box of diagonal stripes 108 is written into the page memory first. Next, a wide box of oppositely directed diagonal stripes 110 is written into the page memory overlying the tall box 107. In the resulting pattern 112, the wide box 110 obscures the tall box 108 in the region of their intersection.

In the example illustrating the transparent mode of operation, a wide box 110' is again written into the page memory over a tall box 108'. This time however, in the resulting pattern 112', the pattern of the tall box 108' shows through in the area of intersection between the two boxes.

Referring now to FIG. 1, the raster image processor is placed in the transparent mode of operation, by supplying the signal from the tint generator 50 to AND gate 80, as shown by dashed line 114, through a switch 116. With the switch 116 in the transparent mode position shown in FIG. 1, 0's cannot be written into the page memory 30 since a 0 output from the tint generator 50 will cause the output of AND gate 80 to be 0, thereby preventing input to the memory.

The switch 116 is controlled by ICE 16 to place the raster image processor 10 in the transparent or opaque mode of operation. In the opaque mode of operation, the switch 16 is placed in an alternate position, where a constant logical 1 is applied to AND gate 80.

The present invention may be used to advantage to drive a color marking engine in either the opaque or transparent mode of operation. In the opaque mode of operation, color images are defined in a hierarchical order, such that when graphic objects or alphanumeric characters overlap, objects that are higher in the hierarchy obscure underlying objects that are lower in the hierarchy. In the prior art, generating the bit maps for the color components of an opaque model color image was a computationally intensive process. The present invention substantially simplifies the computation by accumulating the color components in the page memory in the manner described above with reference to a monochromatic image.

The bit maps of the color components of a color image (e.g. cyan, magenta, yellow and black) may be generated and printed one at a time (serial color), or all at once (parallel color). Serial color will be described first with reference to the exemplary display list contained in Table II below.

TABLE II

1. Set page height to ($PH_1$)
2. Set clipping window $W_1$ ($x_a$, $y_a$; $x_b$, $y_b$)
3. Set Texture to $TX_1$
4. Set Color to ($C_1$, $M_1$, $Y_1$, $Bk_1$)
5. Place Object 1 at ($x_1$, $y_1$)
6. Set Texture to $TX_2$
7. Set Color to ($C_2$, $M_2$, $Y_2$, $Bk_2$)
8. Place Object 2 at ($x_2$, $y_2$)

Referring to FIG. 4, for serial color, the tint memory 62 contains a set of tint patterns for each of the primary color components produced by the marking engine. The halftone tint patterns for the color components may be spatially offset from each other to avoid dot overlap between the color components. The tint generator 50 also includes an input (shown by a dashed line) designating the particular color component to be generated. This is a two bit command to select, for example one of the four color components cyan (C), magenta (M), yellow (Y) or black (Bk). This command is latched into the latch 60 along with the tint level command, and is employed to address tint memory 62.

Figure 14:
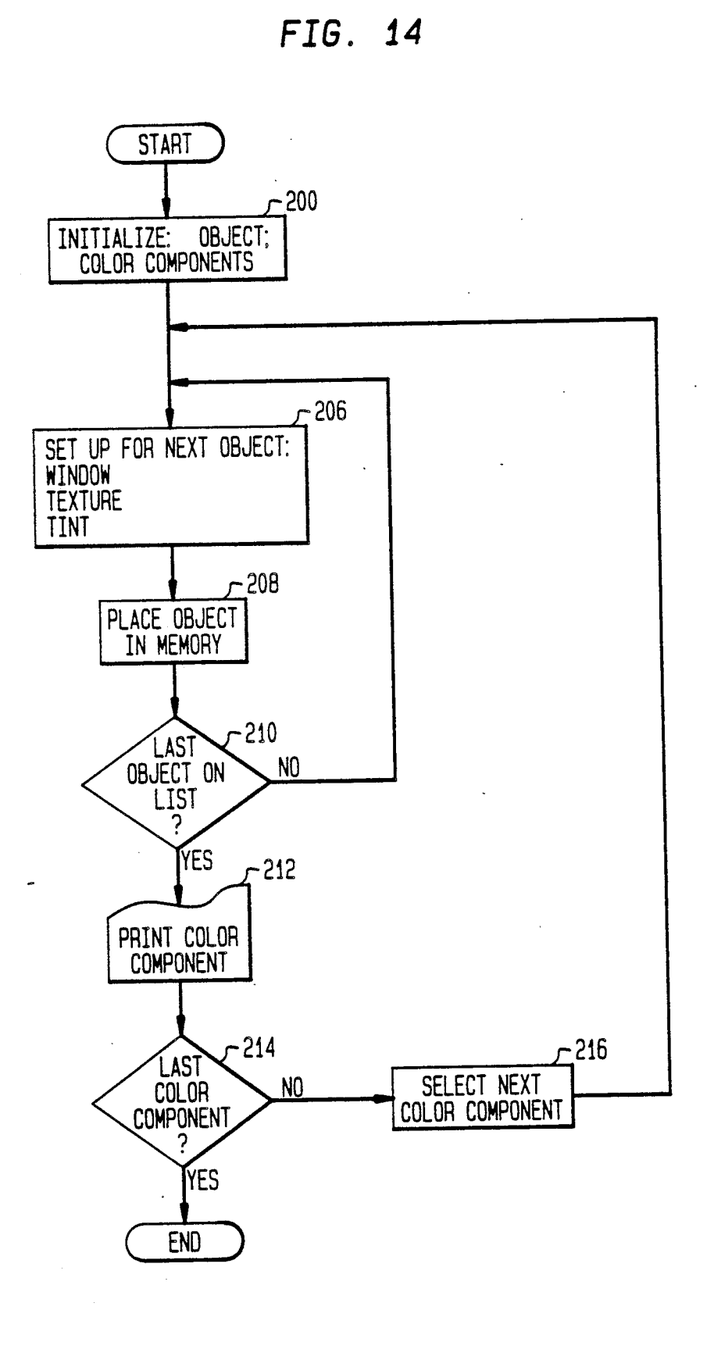
FIG. 14 is a flow chart showing the steps in generating a color image in the serial mode.

Referring now to FIG. 14, the steps performed by the ICE 16 in processing the display list to produce a serial color image will be described. The object and color components are unitialized (200) by starting at the top of the display list and selecting a first color component to be processed (e.g. Black). Next, the setup for placing the next object in memory is performed (206) by setting the parameters for the clipping window, the texture, and the tint level for the first color component. The bit map for the first object is generated and written into page memory (208) as described above for a monochrome image. A check is made (210) to see if this is the last object on the list. If not, the previous steps (206, 208) are repeated for the next object on the list. When all of the objects on the list have been placed in the page memory for the first color component, the color component is printed (212) by the marking engine.

Next, a check is made (214) to see if all the color components have been printed. If not, the next color component (e.g. cyan) is selected (216) and the process is started again. The bit map for the next color component is generated and printed (206, 208, 212). This process is continued till all the color components for a page have been printed.

Figure 15:
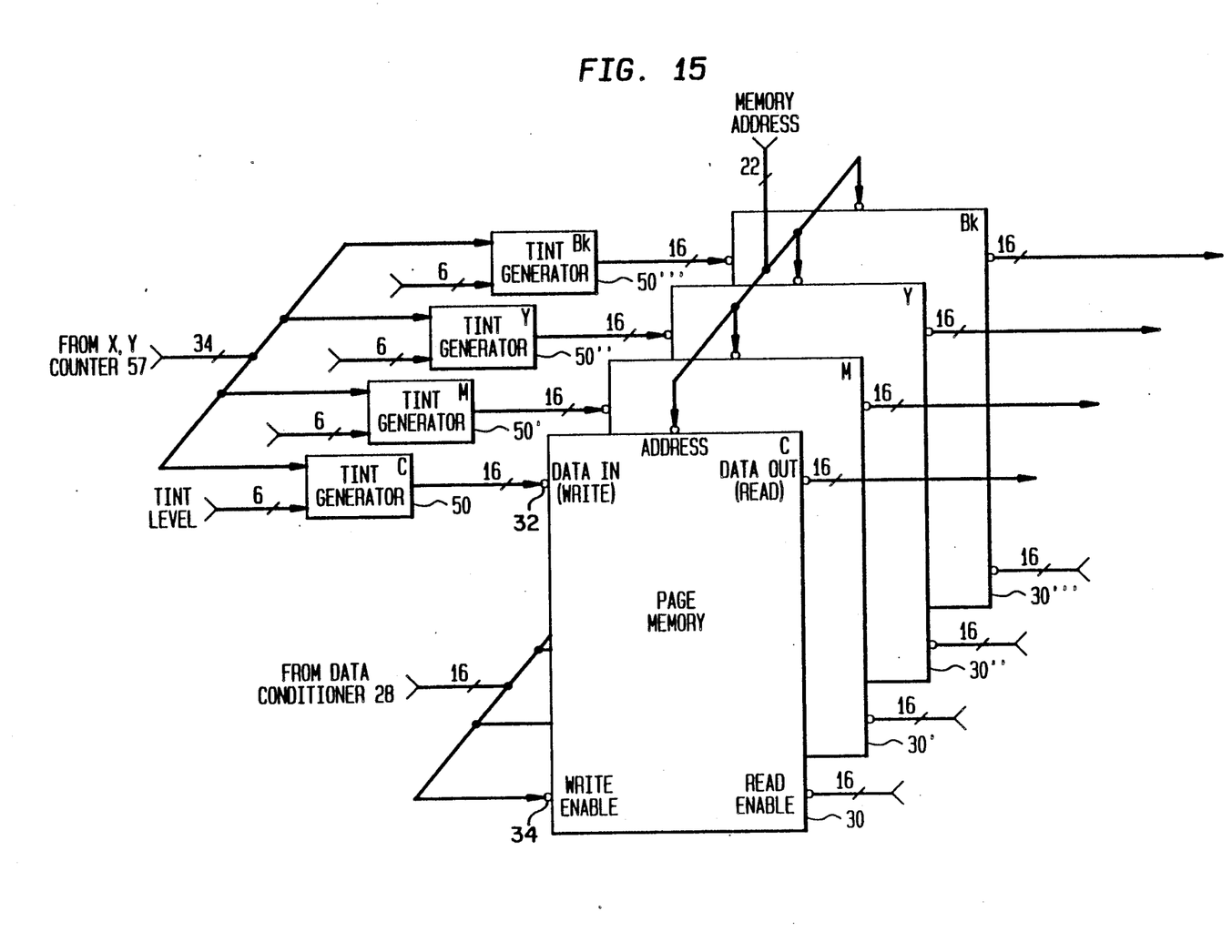
FIG. 15 is a schematic diagram of the memory arrangement for generating a color image in the parallel mode.

In an improvement on the serial process of generating the color component bit maps, all the color component bit maps are compiled simultaneously in a "parallel process". In the parallel process of operating the RIP, a separate page memory 30, 30', 30" and 30''' and a separate tint generator 50, 50', 50" and 50''' is provided for each color component as illustrated schematically in FIG. 15. The three least significant bits of the y coordinate value from x,y counters 57 in ICE 16 are supplied to all the tint generators. Each tint generator receives a respective tint level command from ICE 16, and supplies its output to the corresponding data input 32 of its associated page memory. The conditioned page data from the data conditioner 28 is supplied in parallel to all the write enable inputs 34 of the page memories.

Figure 16:
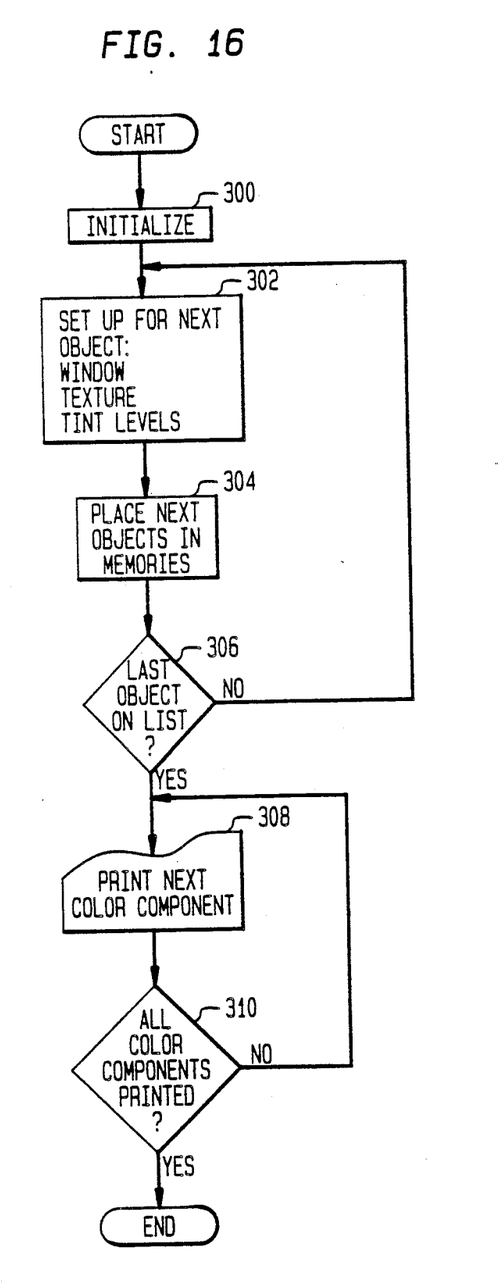
FIG. 16 is a flow chart showing the steps in generating a color image in the parallel mode.

Referring to FIG. 16, the steps performed by the ICE 16 in implementing parallel color will be discussed. First, the process is initialized (300) by starting at the top of the list. Next, setup for the first object is performed (302) by setting the clipping window, selecting the texture pattern, and setting the tint levels for each of the color components. The first object is then placed in page memory at location $x_1,y_1$ (304) by sending the conditioned page data to all of the write enable inputs 34 of the color component page memories simultaneously, and sending the respective tint patterns to the data inputs 32 of the color component page memories. A check is made (306) to see if this is the last object on the list. If not, the next setup is performed (302) and the next object is placed in memory (304) as described above.

When all the objects on the list have been placed in the page memories, the first color component (e.g. Black) is printed (308) by reading out the contents of the memory holding the bit map for the first color component. A check is made (310) to see if all four colors have been printed. If not, the next color component is printed. This process continues until all the color components have been printed.

The parallel process of operation saves time in generating the color component bit maps, at the expense of duplicating hardware (i.e., page memories and tint generators).

INDUSTRIAL APPLICABILITY AND ADVANTAGES

The RIP according to the present invention is useful in the field of printing and in particular for driving an all points addressable marking engine. The RIP has the advantage of generating a bit map for driving the marking engine at a faster rate than the prior art RIP's, and is particularly advantageous for use with a color marking engine to produce images where the colors and textures of objects are separately and independently controlled. The RIP has the further advantage that the process of generating patterns, tints and windows proceeds automatically with the generation of the x and y coordinate values, without the need for algorithmic intervention by a central processing unit.

We claim:

1. A raster image processor, comprising:
   a. a page memory for the storage of a bit pattern representation of a page to be printed by an all points addressable marking engine, said page memory having a data input and a write enable input;
   b. tint generator means for generating a bit pattern representing a halftone tint, and for applying said tint bit pattern to the data input of said page memory; and
   c. data generator means for generating a page bit pattern representing a page of objects such as character fonts and graphic objects, and for applying said page bit pattern to the write enable input of said page memory.

2. The apparatus claimed in claim 1, further comprising:
   a. texture generator means for generating a bit pattern representing a texture pattern; and
   b. means for combining the page bit pattern and the texture bit pattern to produce a combined bit pattern and for applying the combined bit pattern to the memory enable input of said page memory in lieu of the page bit pattern.

3. The apparatus claimed in claim 2, further comprising: window generator means for producing a bit pattern representing a clipping window, and said combining means further combining said window bit pattern with said texture bit pattern and said page bit pattern.

4. The apparatus claimed in claim 3, further including a page address generator for receiving x and y page coordinates and generating a page memory address, the page memory further including a page memory address input for receiving the page memory address, and wherein said tint generator means, said texture generator means and said window generator means receive the x and y page coordinates and produce an output word corresponding to a repeating patterns representing tint, texture and a clipping window respectively.

5. The apparatus claimed in claim 2, further including a page address generator for receiving x and y page coordinates and generating a page memory address, the page memory further including a memory address input for receiving the page memory address, and wherein said tint generator means and said texture generator means receive the x and y page coordinates and produce output words corresponding to repeating patterns representing tint and texture respectively.

6. The apparatus claimed in claim 1, 2, or 3, further comprising means for ANDing the bit pattern representing the halftone tint with the bit pattern representing a page of objects and for applying the ANDed bit pattern to the memory enable input of said page memory.

7. The apparatus claimed in claim 1, for use with a marking engine that produces a color image, said page memory storing a succession of bit patterns representing a succession of primary color components to be printed by said marking engine, and said tint generator means producing a selected tint pattern for each primary color component to produce a spectrum of colors.

8. The apparatus claimed in claim 7, further including means for shifting the tint pattern produced by said tint generator between successive primary color components to minimize the overlap of colored dots in an image produced by the marking engine.

9. A method of bit map page memory control in a raster image processor, comprising the steps of:
   a. generating a data bit pattern representing a page of objects such as character fonts and graphic objects;
   b. applying the data bit pattern to a memory write enable input of a bit map page memory;
   c. generating a bit pattern representing a halftone tint; and
   d. applying the tint bit pattern to a data input of the bit map page memory.

10. The method of bit map page memory control claimed in claim 9, further comprising the steps of:
    a. generating a bit pattern representing a texture
    b. combining the texture bit pattern with the data bit pattern to produce a combined bit pattern; and
    c. applying the combined bit pattern to the memory write enable input of the bit map page memory in lieu of the data bit pattern;

11. The method claimed in claim 10, further comprising the steps of:
    a. generating a bit pattern representing a clipping window; and
    b. combining the clipping window bit pattern with the texture and data bit patterns to produce the combined bit pattern that is applied to the memory write enable input of the page memory.

12. The method claimed in claim 9, further comprising the step of ANDing the bit pattern representing the halftone tint with the data bit pattern to produce an ANDed bit pattern, and applying the ANDed bit pattern to the write enable input of the bit map page memory in lieu of the data bit pattern.

13. The raster image processor claimed in claim 14, further comprising means for ANDing the bit map produced by the tint generator with the page bit pattern to produce an ANDed bit pattern, and for applying the ANDed bit pattern to the "write enable" inputs of the bit map memories in lieu of the page bit pattern.

14. A raster image processor in a color marking engine capable of producing colored marks from a set of primary color components, comprising:
    a. a plurality of bit map memories, one memory for storing a bit map of each of the primary color components produced by the marking engine, said bit map memories having "write", "write enable" and address inputs;
    b. a plurality of tint generator means, one of such tint generator means associated with each bit map memory and responsive to a tint level signal for generating a bit map representing a half tone dot pattern for producing a desired tint level and applying the bit map to the "write" input of the associated bit map memory; and
    c. page builder means for generating a page bit pattern representing a page of objects such as character fonts and graphic objects, and for applying the page bit patterns to the "write enable" inputs of the bit map memories; and
    d. means responsive to instructions designating the color of objects for generating tint level signals and applying the tint level signals to the tint generator means.

15. The raster image processor claimed in claim 14, further comprising:
    a. means for adding a texture pattern to alphanumeric and graphic objects stored in said bit map memories.

16. The raster image processor claimed in claim 14, wherein said tint generator means generate halftone patterns that are offset from each other to minimize color dot overlap.

17. The raster image processor claimed in claim 14, wherein said primary color components are cyan, magenta, yellow and block.

18. A method of operating a raster image processor to drive an all points addressable color marking engine, the raster image processor producing a page bit map of each of a plurality of primary color components from a display list including commands describing objects such as graphic objects and alphanumeric characters and setup commands associated with the commands describing the objects including commands describing halftone tint levels for the primary color components of the objects; comprising the steps of:
 a. processing the display list one object at a time to generate a bit map for each object for a given primary color component;
 b. combining the bit map for each object into a page bit map;
 c. supplying the page bit map to the marking engine to print the given primary color component; and
 d. repeating steps a, b, and c for another primary color component.

19. The method claimed in claim 18, wherein the raster image processor includes a page memory for accumulating and storing a primary color bit map, the page memory having a data input and a write enable input, and wherein said step of combining the bit map for each object into a page bit map further comprises the steps of:
 a. generating, in response to a setup command representing a halftone tint level, a bit pattern representing a halftone dot pattern;
 b. applying the halftone bit pattern to the data input of the page memory;
 c. generating, in response to a command describing an object, a bit pattern representing the object; and
 d. applying the bit pattern representing the object to the write enable input of the page memory.

20. The method claimed in claim 19, wherein the setup commands further include commands describing texture patterns to be applied to the objects, and wherein said step of generating a page bit map further comprises the steps of:
 a. generating, in response to a texture command, a bit pattern representing the texture pattern;
 b. combining the texture bit pattern with the object bit pattern to produce a combined bit pattern representing the textured object; and
 c. applying the combined bit pattern to the write enable input of the page memory.

21. The method claimed in claim 19, wherein the setup commands further include commands describing a clipping window, inside of which an object is printed, and outside of which an object is not printed, and wherein said step of generating a page bit map further comprises the steps of:
 a. generating, in response to a setup command describing a clipping window, a bit pattern representing the clipping window;
 b. combining the clipping window bit pattern with the object bit pattern to produce a combined bit pattern representing the portion of the object inside the clipping window; and
 c. applying the combined bit pattern to the write enable input of the page memory.

22. The method claimed in claim 19, further comprising the step of ANDing the bit pattern representing the halftone bit pattern with the bit pattern representing an object to produce an ANDed bit pattern, and applying the ANDed bit pattern to the write enable input of the page memory in lieu of the bit pattern representing the object.

23. The method claimed in claim 18, wherein the color components are cyan, magenta, yellow and black, and black is the first primary color component to be printed.

24. A raster image processor for an all points addressable marking engine, comprising:
 a. a page memory for storing a bit map representation of a page of data to be printed by the marking engine, the page being arranged as bit-wide columns of n-bit words;
 b. means for generating data bit maps of objects such as graphic objects and alphanumeric characters, said data bit maps being generated as blocks of bits having bit-wide columns of n-bit data words; and
 c. data conditioner means for placing a data word at any bit location on a page, said data conditioner being responsive to a signal representing an offset of m bits, where m is between 0 and n−1, for producing conditioned data words shifted by m bits from said data word, for the first word in a column, said conditioned data word contains 0's for the first m bits, and the first n-m bits of the data word for the last n-m bits, following conditioned data words in a column containg the last m bits of the previous word as the first m bits of the conditioned data word.

25. The raster image processor claimed in claim 24, wherein said page memory includes a write enable input and a data input, and further comprising:
 a. means for generating bit maps representing halftone tint patterns, said halftone bit maps being generated as blocks of bits having bit wide columns of n-bit words, said halftone tint pattern words being applied to the data input of said page memory, and said conditioned data words being applied to the write enable input of said memory.

26. The raster image processor claimed in claim 25, further comprising: means for ANDing the bit maps representing halftone tint patterns and the conditioned data words to produce ANDed data words and applying said ANDed data words to the write enable input of the memory in lieu of the conditioned data words.

27. The raster image processor claimed in claim 25, further comprising;
 a. means for generating texture bit maps, said texture bit maps being generated as blocks of bits having bit-wide columns of n-bit texture words;
 b. said data conditioner means further including means for ANDing said texture words with said conditioned data words to produce further conditioned data words, and said further conditioned data words being applied to said write enable input of said page memory.

28. The raster image processor claimed in claim 25, further comprising:
 a. means for generating clipping window bit maps, said clipping window bit maps being generated as blocks of bits having bit-wide columns of n-bit clipping window words; and b. said data conditioner means further including means for ANDing said clipping window words with said conditioned data words to produce conditioned data words, said conditioned data words being applied to said write enable input of said page memory.

29. A raster image processor for an all points addressable marking engine, comprising:
   a. a page memory for storing a bit map representation of a page of data to be printed by the marking engine, the bit map data being stored in the page memory as a string of sequentially numbered n-bit words;
   b. means for generating a signal (PH) representing page height in n-bit words;
   c. x,y counter means for generating an m-bit x page coordinate and an m-bit y page coordinate; and
   d. page memory address generator means responsive to a signal representing page height and the x and y page coordinates for generating a page memory address according to the formula:

$$PA = (PH*y) + x/n,$$

where x/n is the x coordinate expressed in n-bit words.

30. The apparatus claimed in claim 29, wherein said page memory includes a data input and a write enable input, and further comprising:
   a. page builder means for generating a data bit map of graphic objects and alphanumeric characters, said page builder means being responsive to x and y coordinates from said x,y counter means for supplying an n-bit data word to said write enable input of said page memory;
   b. tint generator means for generating a bit map pattern representing a halftone tint, said tint generator means being responsive to x and y coordinates from said x,y counter means for supplying an n-bit tint word to said data input of said page memory.

31. The apparatus claimed in claim 30, further comprising means for ANDing the bit map representing a halftone tint, and the data bit map to produce an ANDed bit map, and for applying the ANDed bit map to the write enable input of the page memory in lieu of the data bit map.

* * * * *